(12) United States Patent
Mao et al.

(10) Patent No.: US 10,819,204 B2
(45) Date of Patent: Oct. 27, 2020

(54) VIBRATION MOTOR

(71) Applicant: AAC Technologies Pte. Ltd., Singapore (SG)

(72) Inventors: Lubin Mao, Shenzhen (CN); Yun Tang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 35 days.

(21) Appl. No.: 16/233,468

(22) Filed: Dec. 27, 2018

(65) Prior Publication Data

US 2019/0207498 A1    Jul. 4, 2019

(30) Foreign Application Priority Data

Jan. 3, 2018    (CN) .......................... 2018 1 0004438

(51) Int. Cl.
*H02K 33/14*      (2006.01)
*B06B 1/04*      (2006.01)
*H02K 35/02*      (2006.01)

(52) U.S. Cl.
CPC ............. *H02K 33/14* (2013.01); *B06B 1/045* (2013.01); *H02K 35/02* (2013.01)

(58) Field of Classification Search
CPC ........ B06B 1/045; H02K 33/14; H02K 35/02; H02K 33/02; H02K 33/12; H02K 33/16
USPC .......................................................... 310/15
See application file for complete search history.

(56) References Cited

U.S. PATENT DOCUMENTS

| | | | | | |
|---|---|---|---|---|---|
| 6,008,561 | A | * | 12/1999 | Tang | .............. H02K 19/103 310/180 |
| 2012/0169148 | A1 | * | 7/2012 | Kim | .............. H02K 33/16 310/25 |
| 2015/0155761 | A1 | * | 6/2015 | Richard | .............. H02K 11/33 310/68 D |
| 2016/0013710 | A1 | * | 1/2016 | Dong | .............. H02K 33/16 310/25 |
| 2017/0012518 | A1 | * | 1/2017 | Wang | .............. H02K 33/16 |
| 2017/0033651 | A1 | * | 2/2017 | Mao | .............. H02K 33/16 |
| 2017/0033663 | A1 | * | 2/2017 | Wang | .............. H02K 33/00 |
| 2017/0070132 | A1 | * | 3/2017 | Wang | .............. H02K 33/16 |
| 2017/0110947 | A1 | * | 4/2017 | Mao | .............. H02K 5/04 |
| 2017/0117790 | A1 | * | 4/2017 | Mao | .............. H02K 1/34 |
| 2017/0117791 | A1 | * | 4/2017 | Mao | .............. H02K 1/34 |

(Continued)

FOREIGN PATENT DOCUMENTS

CN    204967589 B1    1/2016
CN    205081658 B1    3/2016

OTHER PUBLICATIONS

1st Office Action dated Jul. 15, 2019 by SIPO in related Chinese Patent Application No. 201810004438.5 (13 Pages).

*Primary Examiner* — Alex W Mok
(74) *Attorney, Agent, or Firm* — IPro, PLLC; Na Xu

(57) ABSTRACT

The present disclosure provides a vibration motor. The vibration motor includes a first vibrator and a second vibrator which perform relative moved. One of the first vibrator and the second vibrator is provided with a magnetic circuit, and the other one is provided with a coil corresponding to the magnetic circuit. The coil and the magnetic circuit interact to generate a driving force to drive the relative moved of the first vibrator and the second vibrator. A BL value of the magnetic circuit can be effectively improved, a better vibration feeling can be achieved, and the circuit reliability can be improved.

6 Claims, 5 Drawing Sheets

(56) References Cited

U.S. PATENT DOCUMENTS

| | | | | |
|---|---|---|---|---|
| 2017/0117793 A1* | 4/2017 | Mao | ........................ | H02K 99/20 |
| 2017/0120297 A1* | 5/2017 | Chun | ...................... | H02K 33/16 |
| 2017/0120298 A1* | 5/2017 | Mao | ........................ | B06B 1/045 |
| 2017/0144191 A1* | 5/2017 | Mao | ........................ | B06B 1/045 |
| 2017/0179804 A1* | 6/2017 | Xu | ........................ | H02K 33/16 |
| 2017/0222532 A1* | 8/2017 | Wang | ..................... | H02K 33/16 |
| 2017/0288521 A1* | 10/2017 | Jin | ......................... | H02K 33/02 |
| 2017/0288524 A1* | 10/2017 | Jin | ......................... | H02K 5/225 |
| 2017/0341108 A1* | 11/2017 | Mao | ........................ | B06B 1/045 |
| 2017/0366077 A1* | 12/2017 | Oonishi | ............... | H02K 11/046 |

* cited by examiner

VIBRATION MOTOR

CROSS-REFERENCE TO RELATED APPLICATIONS

This application claims the priority benefit of Chinese Patent Applications Ser. No. 201810004438.5 filed on Jan. 3, 2018, the entire content of which is incorporated herein by reference.

TECHNICAL FIELD

The present disclosure relates to a vibration motor, and more particularly to a vibration motor applied to portable consumer electronics.

BACKGROUND

With the development of an electronic technology, portable consumer electronics are increasingly sought after by people, such as mobile phones, handheld game consoles, navigation devices or handheld multimedia entertainment devices etc., which generally use vibration motors to perform system feedback, for example call reminders, message reminders and navigation reminders of mobile phones, and vibration feedback of game consoles. Such a wide range of application requires high performance and long service life of a vibration motor.

The vibration motor generally includes a housing having a receiving space, a vibrator received in the receiving space, and an elastic member connected to the housing and the vibrator, the elastic member supporting the vibrator to reciprocate in the housing to generate vibration. The vibration motor in the prior art generally includes only one vibrator to achieve vibration. A magnetic circuit structure is relatively simple, and a BL value (magnetic coefficient) is small. If a better vibration feeling is needed, the voltage needs to be increased, thus making the circuit reliability at risk.

Therefore, there is a need to provide a novel vibration motor to resolve the foregoing problems.

DETAILED DESCRIPTION

The present disclosure will be further described below with reference to the accompanying drawings.

Figure 1:
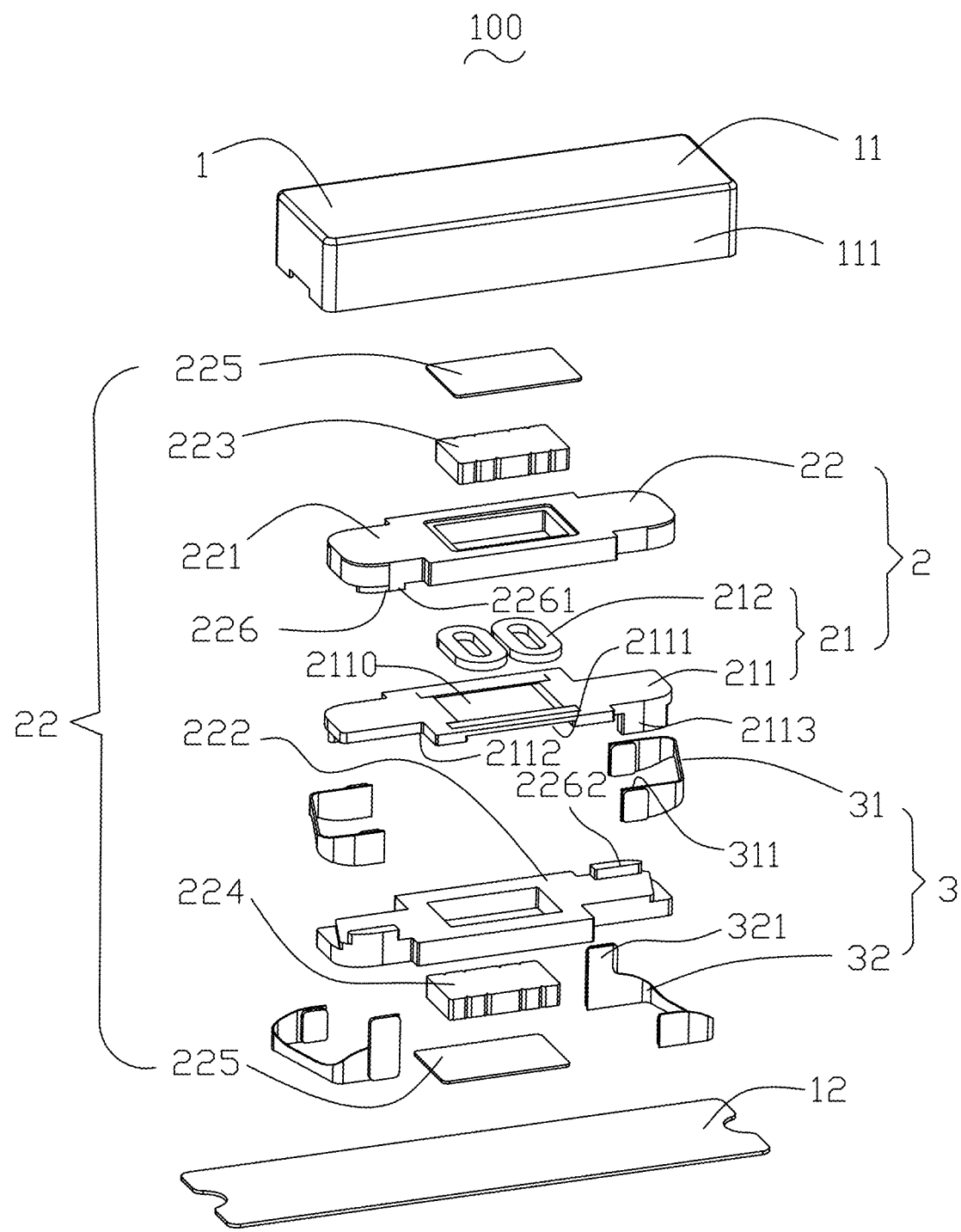
FIG. 1 is a schematic structural exploded view of a vibration motor according to the present disclosure.

As shown in FIG. 1, the present disclosure provides a vibration motor 100, including a housing 1 having a receiving space, a vibrator 2 received in the housing 1, and an elastic member 3 for elastically supporting the vibrator 2.

The housing 1 includes a cover plate 11 having a side wall 111, and a bottom plate 12 covered by the cover plate 11 and forming a receiving space with the cover plate 11.

The vibrator 2 includes a first vibrator 21 and a second vibrator 22 which perform relative moved. One of the first vibrator 21 and the second vibrator 22 is provided with a magnetic circuit, and the other one is provided with a coil corresponding to the magnetic circuit. The coil and the magnetic circuit interact during the energization process to generate driving forces in opposite directions on the first vibrator 21 and the second vibrator 22 respectively, so as to drive the first vibrator and the second vibrator to perform relative moved parallel to the bottom plate 12 along different tracks.

Specifically, the first vibrator 21 includes a first weight 211 and a coil 212 disposed on the first vibrator 211. Where the first weight 211 is provided with a clamping groove 2111 for fixing the coil 212, and the coil 212 is fixed inside the clamping groove 2111.

The second vibrator 22 includes a second weight 221 and a third weight 222 assembled together, and a first magnetic circuit 223 fixed on the second weight 221 and a second magnetic circuit 224 fixed on the third weight 222. A gap is provided between the second weight 221 and the third weight 222, and the first weight 211 is disposed in the gap and spaced away from the second weight 221 and the third weight 222. The first magnetic circuit 223 and the second magnetic circuit 224 are disposed corresponding to the coil 212 of the first vibrator 21 separately, and the coil 212 is located in a magnetic gap formed between the first magnetic circuit 223 and the second magnetic circuit 224. Under the working state, the coil 212 is energized, and the first vibrator 21 is driven to vibrate by the Lorentz force. Correspondingly, the first magnetic circuit 223 and the second magnetic circuit 224 are subjected to the anti-Lorentz force to drive the second vibrator 22 to vibrate.

The second weight 221 and/or the third weight 222 are/is provided with a positioning portion 226 for achieving assembly of the second weight 221 and the third weight 222. Specifically, in this embodiment, the positioning portion 226 includes a first positioning portion 2261 located on the second weight 221 and a second positioning portion 2262 located on the third weight 222. The first positioning portion 2261 is formed by protruding from the second weight 221 to the third weight 222. The second positioning portion 2262 is formed by protruding from the third weight 222 to the second weight 221. The top surface of the first positioning portion 2261 and the top surface of the second positioning portion 2262 abut against each other and are fixed together, so that the second weight 221 and the third weight 222 form an integrated structure to achieve coordinated vibration. The fixing mode may be gluing or welding. Certainly, in other optional embodiments, the positioning portion may be provided only on one of the second weight 221 or the third weight 222, or the positioning portion may not be provided, but an auxiliary fixing device may be used, or it is also feasible to directly inject the second weight 221 and the third weight 222 by means of integral injection molding. As long as the second weight 221 and the third weight 222 are assembled together, it is implementable.

The first weight 211 is provided with a reserved groove 2112 for avoiding the positioning portion 226. In this way, it can be ensured that the vibrations of the first vibrator 21 and the second vibrator 22 do not interfere with each other, and the reliability performance of the product is improved.

The second weight 221 and the third weight 222 are separately provided with a through hole penetrating through upper and lower surfaces, and the first magnetic circuit 223 and the second magnetic circuit 224 are disposed inside the through holes of the second weight 221 and the third weight 222 respectively. The first magnetic circuit 223 and the second magnetic circuit 224 may be the same or different in structure. Specifically, in this embodiment, the first magnetic circuit 223 and the second magnetic circuit 224 each include three permanent magnets disposed inside the through hole side by side. In other optional embodiments, it is also implementable that a plurality of through holes is provided, or only one permanent magnet is provided. Certainly, the number and structure of the permanent magnets are not limited thereto.

In order to improve the magnetic efficiency of the magnetic circuit, the first weight 211 is further provided with a leakage hole 2110 penetrating through the upper and lower surfaces, so that the upper and lower surfaces of the coil 212 may correspond to the magnetic circuit without being shielded, thereby improving the electromagnetic induction efficiency. The vibrator 2 further includes a magnetic conductive sheet 225 attached to the first magnetic circuit 223 and the second magnetic circuit 224 for converging diverging magnetic induction lines to increase the magnetic induction intensity.

Figure 2:
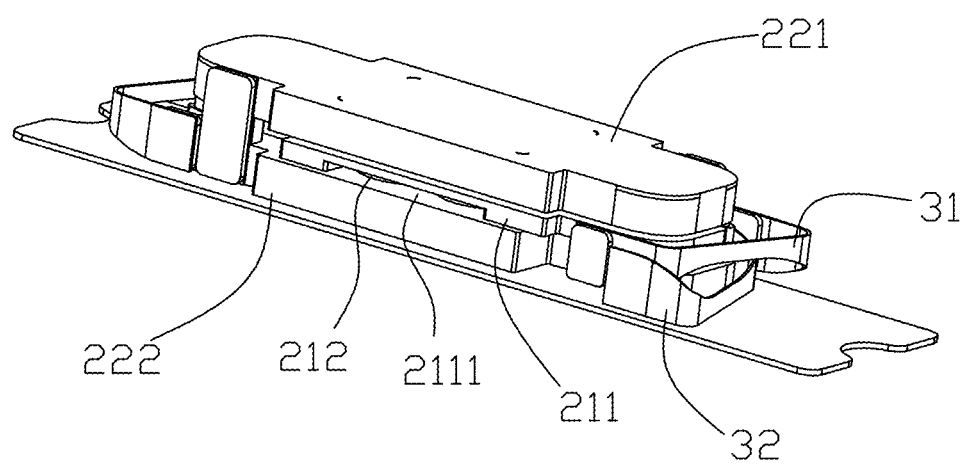
FIG. 2 is a schematic partial structural assembly view of a vibration motor according to the present disclosure.
Figure 3:
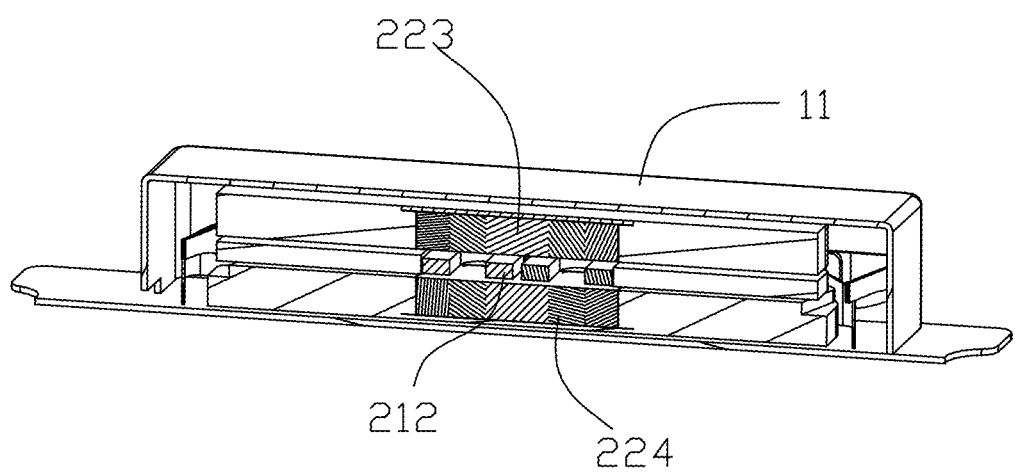
FIG. 3 is a section view of a vibration motor according to the present disclosure.

As shown in FIG. 2 and FIG. 3, the elastic member 3 includes a first elastic member 31 elastically supporting the first vibrator 21 and a second elastic member 32 elastically supporting the second vibrator 22. Where the first elastic member 31 and the second elastic member 32 are a pair of C-shaped springs, one end is fixed on the vibrator 2, and the other end is fixed on the side wall 111 of the housing 1. The first elastic member 31 and the second elastic member 32 support the first vibrator 21 and the second vibrator 22 independently of each other.

The first weight 211 is provided with a fixing platform 2113 for fixing the first elastic member 31, the first elastic member 31 is provided with a first fixing portion 311 connected to the fixing platform 2113, and the second elastic member 32 includes a second fixing portion 321 connected to the positioning portion 226. The second fixing portion 321 covers the positioning portion 226 and connects the second weight 221 and the third weight 222. Thus, the fixing reliability of the vibrator 2 is ensured.

Figure 4:
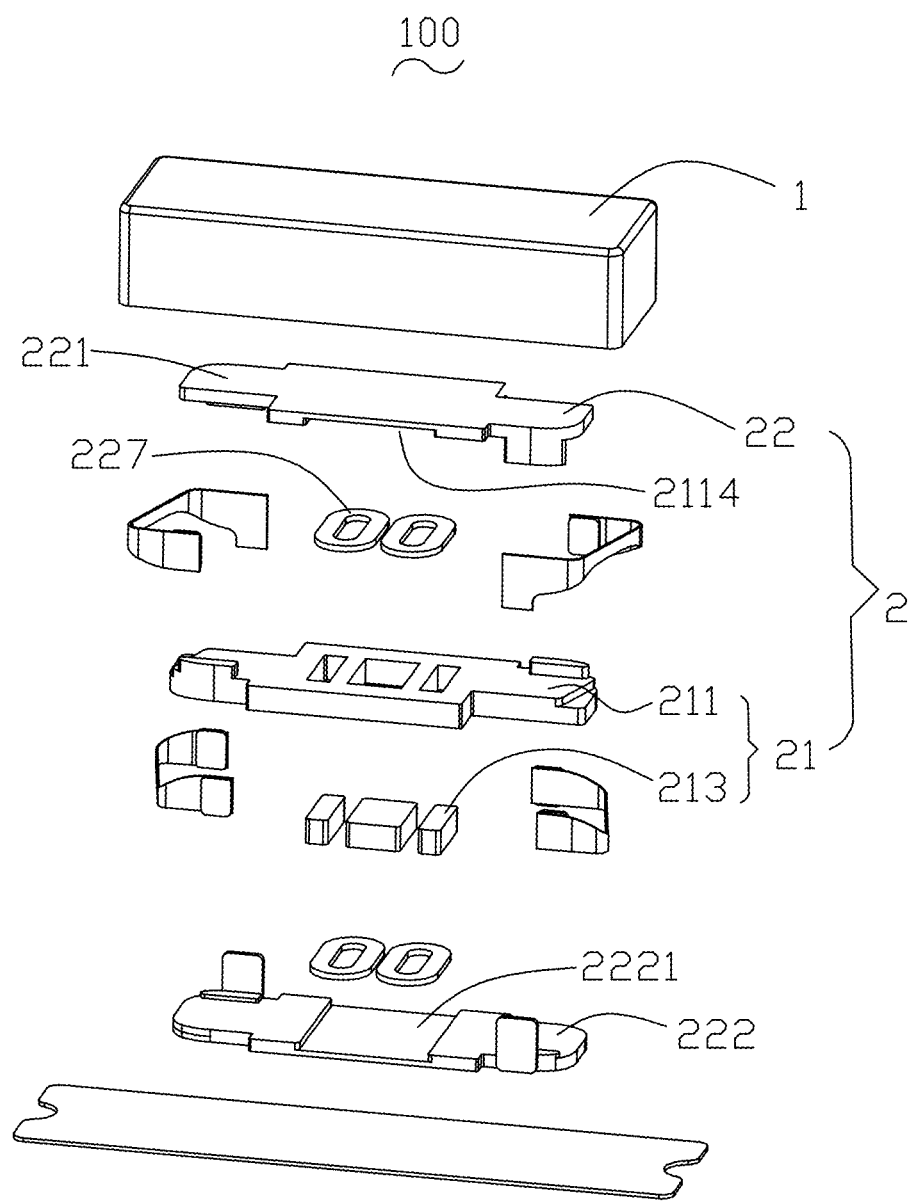
FIG. 4 is a schematic structural exploded view of another embodiment of a vibration motor according to the present disclosure.
Figure 5:
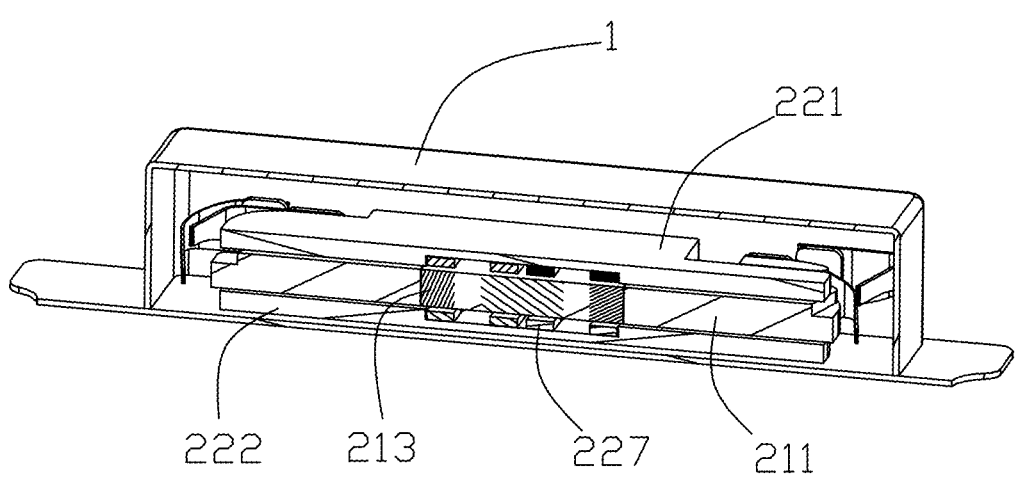
FIG. 5 is a section view of another embodiment of a vibration motor according to the present disclosure.

FIG. 4 and FIG. 5 show another embodiment of the present disclosure. This embodiment is approximately the same as the first embodiment, except that in this embodiment, the first vibrator 21 or the first weight 211 is provided with a magnetic circuit, and the second vibrator 22 or the second weight 221 and the third weight 222 are provided with coils, so as to form a structure in which a magnetic circuit is sandwiched between the upper and lower coils. The principle is the same as the first embodiment.

Specifically, the vibration motor of this embodiment includes a housing 1, a vibrator 2 received in the housing 1, and an elastic member 3 for elastically supporting the vibrator 2.

The vibrator 2 includes a first vibrator 21 and a second vibrator 22 which perform relative moved. The first vibrator 21 includes a first weight 211 and a magnetic circuit 213 disposed on the first vibrator 211. The first weight 211 is provided with a through hole for fixing the magnetic circuit 213, and the magnetic circuit 213 is fixed inside the through hole. In this embodiment, a plurality of through holes is provided, and the magnetic circuits are a plurality of rectangular permanent magnets, which are disposed inside the through holes in one-to-one correspondence. Certainly, in other optional embodiments, there may be only one through hole and a plurality of permanent magnets is disposed together inside the same through hole, or only one permanent magnet may be disposed, both of which can achieve the objective of the present disclosure.

The second vibrator 22 includes a second weight 221 and a third weight 222 assembled together, and coils 227 respectively fixed on the second weight 221 and the third weight 222.

A gap is provided between the second weight 221 and the third weight 222, and the first weight 211 is disposed in the gap and spaced away from the second weight 221 and the third weight 222. The coils 227 are disposed corresponding to the magnetic circuits 213 respectively, and the magnetic circuits 213 are located between the two coils 227.

The second weight 221 is provided with a first fixing groove 2114 recessed away from the first weight 211; the third weight 222 is provided with a second fixing groove 2221 recessed away from the first weight 211. The coils 227 are fixed inside the first fixing groove 2114 and the second fixing groove 2221 respectively. Certainly, in other optional embodiments, it is also implementable that the first fixing groove 2114 or the second fixing groove 2221 is not provided, and the coil is directly fixed on the surface of the second weight 221 or the third weight 222.

Under the working state, the coil 227 is energized to act on the magnetic circuit 213 to generate a driving force to drive the vibrator to vibrate. The principle is the same as the first embodiment.

A vibration motor provided in the present disclosure includes a first vibrator and a second vibrator which perform relative moved, where one of the first vibrator and the second vibrator is provided with a magnetic circuit, and the other one is provided with a coil corresponding to the magnetic circuit. The coil and the magnetic circuit interact to generate a driving force to drive the relative moved of the first vibrator and the second vibrator. A BL value of the magnetic circuit can be effectively improved, a better vibration feeling can be achieved, and the circuit reliability can be improved.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A vibration motor, comprising a housing having a receiving space, a vibrator received in the housing, and an elastic member elastically supporting the vibrator, wherein the vibrator comprises a first vibrator and a second vibrator which perform relative moved, the elastic member comprises a first elastic member elastically supporting the first vibrator and a second elastic member elastically supporting the second vibrator, one of the first vibrator and the second vibrator is provided with a magnetic circuit, the other one of the first vibrator and the second vibrator is provided with a coil corresponding to the magnetic circuit, and the coil and the magnetic circuit interact to generate a driving force to drive the relative moved of the first vibrator and the second vibrator, the first vibrator comprises a first weight, the second vibrator comprises a second weight and a third weight assembled together, a gap is provided between the second weight and the third weight, and the first weight is disposed in the gap and spaced away from the second weight and the third weight, the second weight and/or the third weight are/is provided with a protruding positioning portion, the second weight and the third weight are assembled together by using the positioning portion, and the first weight is provided with a reserved groove for avoiding the positioning portion, the first weight is provided with a fixing platform for fixing the first elastic member, the first elastic member is provided with a first fixing portion connected to the fixing platform, and the second elastic member comprises a second fixing portion connected to the positioning portion, the second fixing portion covers the positioning portion and connects the second weight and the third weight.

2. The vibration motor according to claim 1, wherein the positioning portion comprises a first positioning portion on the second weight and a second positioning portion on the third weight, where the first positioning portion and the second positioning portion abutting against each other.

3. The vibration motor according to claim 1, wherein the first vibrator is provided with a magnetic circuit, the second vibrator is provided with a coil, the first weight is provided with a through hole penetrating through upper and lower surfaces, the magnetic circuit comprises at least one permanent magnet disposed inside the through hole, the second weight and the third weight are separately provided with a coil, and the permanent magnet is correspondingly disposed between the coils.

4. The vibration motor according to claim 3, wherein the second weight and/or the third weight are/is provided with a fixing groove recessed away from the first weight, and the coil is fixed inside the fixing groove.

5. The vibration motor according to claim 1, wherein the first vibrator is provided with a coil, and the second vibrator is provided with a magnetic circuit, the magnetic circuit comprising a first magnetic circuit fixedly disposed on the second weight and a second magnetic circuit disposed on the third weight.

6. The vibration motor according to claim 5, wherein the second weight and the third weight are separately provided with a through hole penetrating through upper and lower surfaces, both the first magnetic circuit and the second magnetic circuit being disposed inside the through hole.

* * * * *